(12) United States Patent
Imai

(10) Patent No.: US 6,398,379 B1
(45) Date of Patent: Jun. 4, 2002

(54) DISPLAY APPARATUS

(75) Inventor: Fumihito Imai, Tokyo (JP)

(73) Assignee: NEC Corporation, Tokyo (JP)

( * ) Notice: Subject to any disclaimer, the term of this patent is extended or adjusted under 35 U.S.C. 154(b) by 112 days.

(21) Appl. No.: 09/635,211

(22) Filed: Aug. 9, 2000

(30) Foreign Application Priority Data

Aug. 9, 1999 (JP) .......................................... 11-225018

(51) Int. Cl.[7] .............................. H04M 1/22; F21V 9/16
(52) U.S. Cl. .............................. 362/24; 362/29; 362/84; 362/88; 116/250; 250/463.1; 368/67
(58) Field of Search ........................... 362/24, 260, 23, 362/31, 88, 551, 558, 559, 561, 257, 311, 84, 29; 116/250; 250/463.1; 368/67

(56) References Cited

U.S. PATENT DOCUMENTS 4,181,925 A * 1/1980 Burrows et al. ............... 362/23
4,297,681 A * 10/1981 Dircksen ...................... 362/23
4,561,042 A * 12/1985 Wehner et al. ............... 116/286
6,082,867 A * 7/2000 Chien ........................... 313/512
6,270,229 B1 * 8/2001 Chien ........................... 362/84

* cited by examiner

Primary Examiner—Thomas M. Sember
Assistant Examiner—David V. Hobden
(74) Attorney, Agent, or Firm—Young & Thompson

(57) ABSTRACT

A display apparatus includes a display apparatus main body, illuminating component, and transparent plate. The display apparatus main body has a flat screen. The illuminating component is formed into a frame to, correspond to a peripheral edge portion of the screen, and is arranged in tight contact with the screen. The transparent plate is arranged on an opposite side of the screen in tight contact with the illuminating component to face the screen. The illuminating component entirely seals a peripheral portion of a gap between the screen and transparent plate.

8 Claims, 3 Drawing Sheets

DISPLAY APPARATUS

BACKGROUND OF THE INVENTION

The present invention relates to a display apparatus and, more particularly to a display apparatus whose screen is illuminated by light from a light source.

In a conventional portable phone and the like, its screen is illuminated so that characters and figures displayed on its display portion can be recognized easily, and even at a dark place. A transparent panel for protecting the screen is usually disposed in front of the display portion. If dust and the like enter a portion between the transparent panel and screen, the displayed contents cannot be seen easily. Therefore, a dustproof measure is implemented for the portion around the transparent panel and screen.

In a conventional display portion of this type, the screen is illuminated by a predetermined illuminating component, and a dustproof screen portion is implemented by interposing a dustproof component in the form of a packing at the peripheral portion between the screen and panel. However, since the illumination and dustproof structure of the screen are achieved by different components, the number of components increases, and a reduction in component cost and assembly cost cannot be realized.

SUMMARY OF THE INVENTION

It is an object of the present invention to provide a display apparatus in which the component cost and assembly cost are reduced by reducing the number of components.

In order to achieve the above object, according to the present invention, there is provided a display apparatus comprising a display unit having a flat screen, an illuminating component formed into a frame to correspond to a peripheral edge portion of the screen and arranged in tight contact with the screen, and a transparent plate arranged on an opposite side of the screen in tight contact with the illuminating component to face the screen, wherein the illuminating component entirely seals a peripheral portion of a gap between the screen and the transparent plate.

DESCRIPTION OF THE PREFERRED EMBODIMENTS

The present invention will be described in detail with reference to the accompanying drawings.

Figure 1:
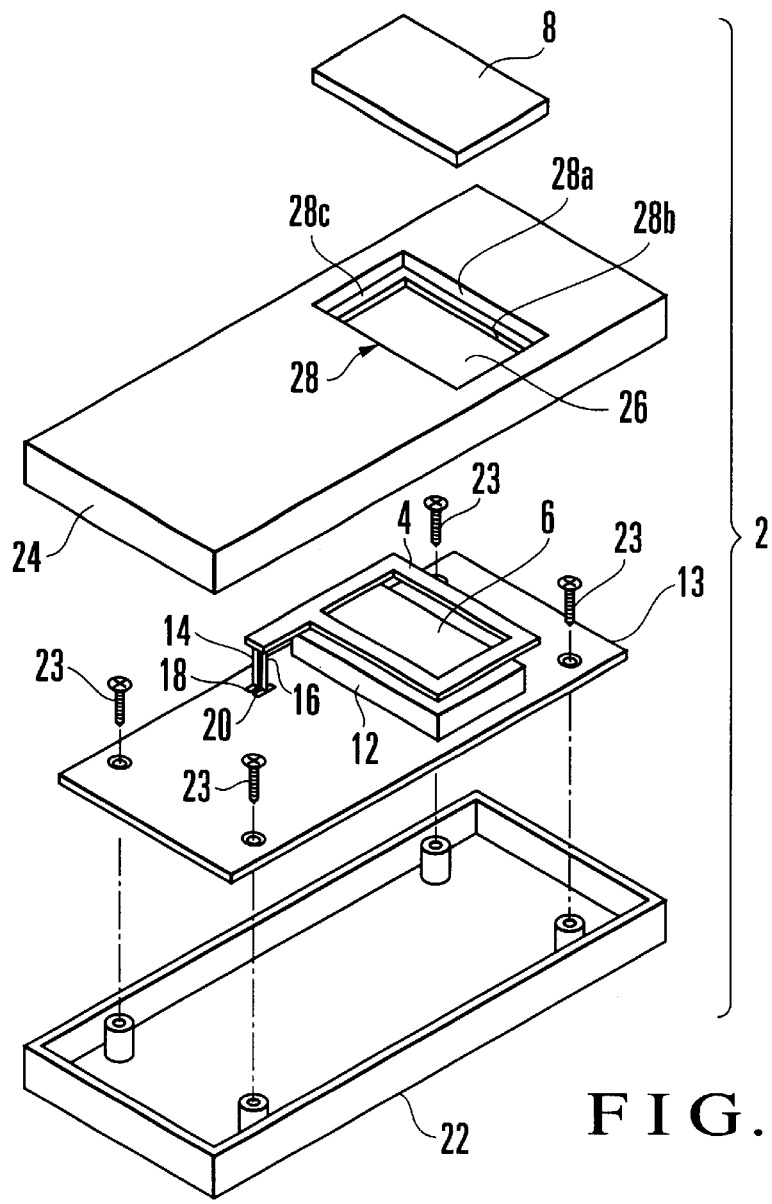
FIG. 1 is an exploded perspective view of the main part of a display apparatus according to the first embodiment of the present invention.
Figure 3:
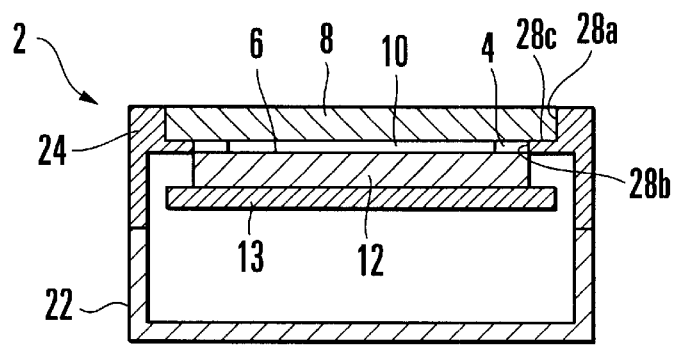
FIG. 3 is a sectional view taken along the line A–A' of FIG. 2.

FIG. 1 shows a display apparatus for a portable phone according to the first embodiment of the present invention. Referring to FIG. 1, an illuminating component 4 of a display apparatus 2 is formed into a rectangular frame to correspond to the four sides of a rectangular flat screen 6 which forms the front surface of a display apparatus main body (display unit) 12, and is arranged in tight contact with the screen 6. As shown in FIG. 3, a transparent plate 8 for protecting the screen 6 is disposed on the illuminating component 4 in tight contact with it, and the peripheral portion of a gap 10 between the screen 6 and transparent plate 8 is sealed by the illuminating component 4 sandwiched between the screen 6 and transparent plate 8.

The illuminating component 4 is made up from an EL (ElectroLuminescent) component and has a rectangular section. The display apparatus main body 12 including the screen 6 is comprised of a liquid crystal display apparatus and is mounted on a circuit board 13 with the screen 6 facing up. Terminals 14 and 16 extend downward from the illuminating component 4 arranged on the display apparatus main body 12 to come into electrical contact with stationary contacts 18 and 20 formed on the circuit board 13. Hence, the illuminating component 4 emits light upon reception of a power supplied from the circuit board 13 to the terminals 14 and 16 through the stationary contacts 18 and 20, to illuminate the flat screen 6 from its peripheral portion.

Figure 2:
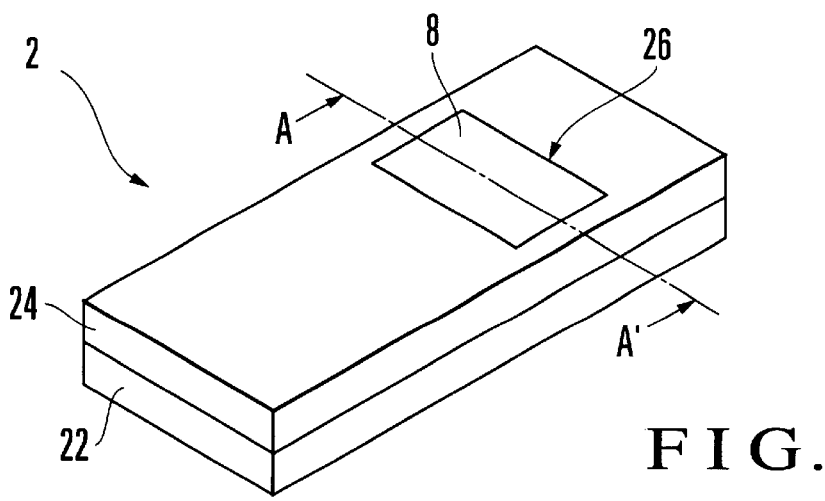
FIG. 2 is a perspective view showing a state wherein the display apparatus shown in FIG. 1 is assembled.

The housing for accommodating the display apparatus main body 12 is constituted by a lower housing 22 and upper housing 24. The circuit board 13 is fixed to the lower housing 22 with screws 23 at its four corners such that the display apparatus main body 12 faces up. A rectangular window 26 is formed in the upper housing 24 at a position facing the flat screen 6. An inner edge portion 28 of the window 26 is comprised of an outer frame 28a formed on the outer surface side, an inner frame 28b formed on the inner surface side and having a size smaller than that of the outer frame 28a, and a step portion 28c connecting the outer and inner frames 28a and 28b to each other to form a step. As shown in FIG. 2, the transparent plate 8 is fitted in the inner edge portion 28 of the window 26 and attached to the upper housing 24.

This arrangement will be described in detail. As shown in FIG. 3, the transparent plate 8 is fitted in the outer frame 28a of the inner edge portion 28 to engage with it, and its peripheral edge portion is supported by the step portion 28c. The illuminating component 4 has a thickness almost equal to that of the inner frame 28b of the inner edge portion 28 of the window, and is brought into tight contact with the transparent plate 8 and display apparatus main body 12 as it is fitted in the inner frame 28b. More specifically, the transparent plate 8 and display apparatus main body 12 form the gap 10 serving as a hermetically closed space corresponding to the thickness of the illuminating component 4. Alternatively, the illuminating component 4 may be bonded to the transparent plate 8 and display apparatus main body 12 by using an adhesive material or the like.

In the display apparatus 2 having the above arrangement, the illuminating component 4 for illuminating the screen 6 seals the gap 10 between the screen 6 and transparent plate 8 at its peripheral portion, so dust and the like will not enter the gap 10. As a result, the illumination and dustproof structure of the screen 6 can be achieved by one component, thus realizing a reduction in component cost and assembly cost.

Figure 4:
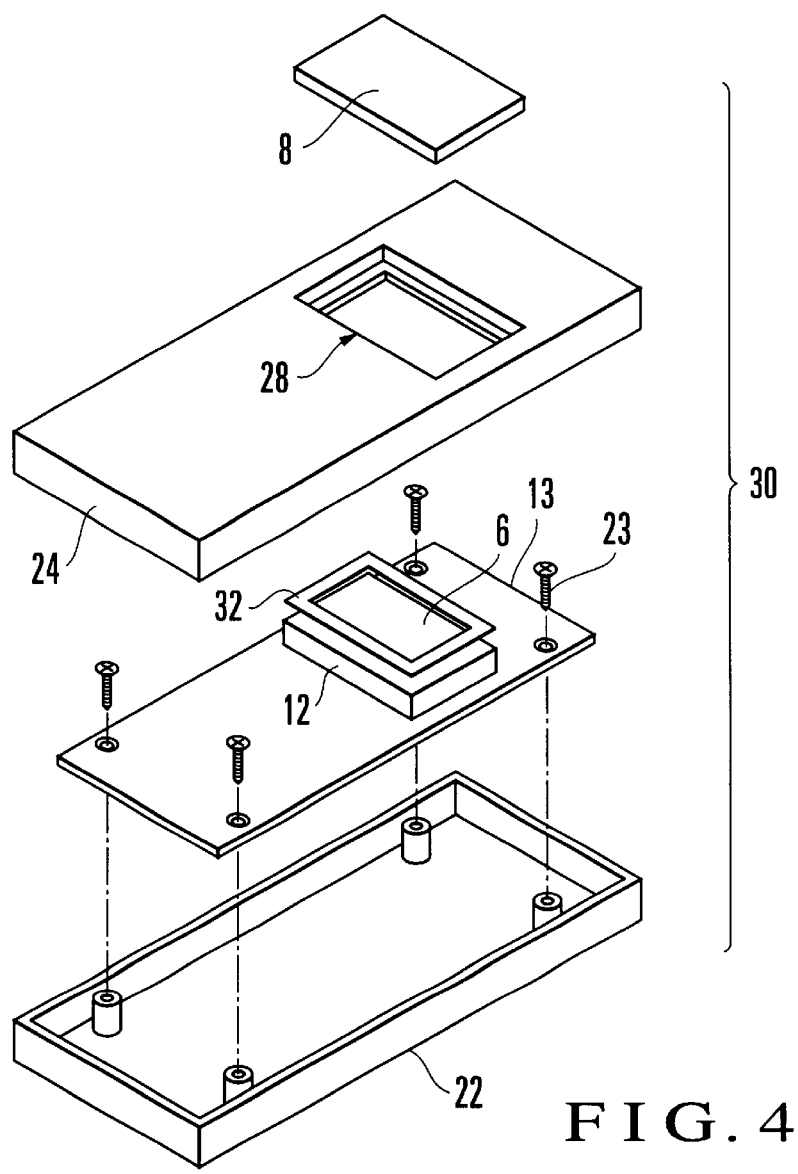
FIG. 4 is an exploded perspective view of the main part of a display apparatus according to the second embodiment of the present invention.
Figure 5:
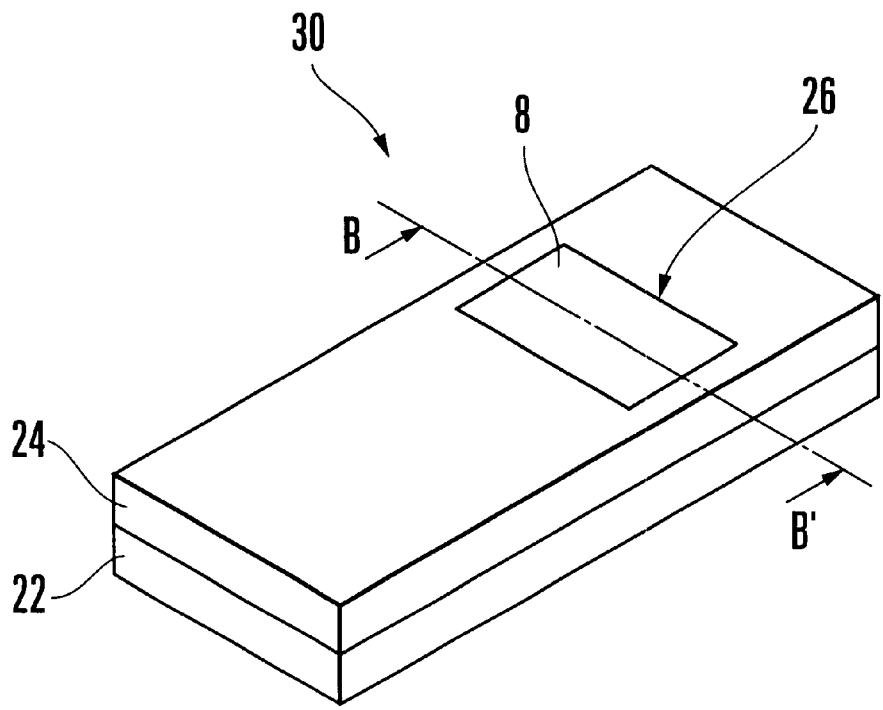
FIG. 5 is a perspective view showing a state wherein the display apparatus shown in FIG. 4 is assembled.
Figure 6:
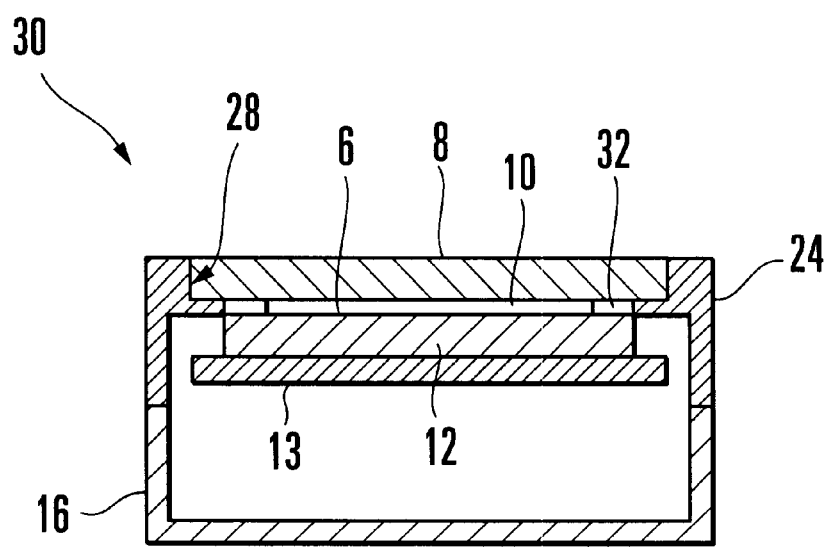
FIG. 6 is a sectional view taken along the line B–B' of FIG. 5.

FIG. 4 shows a display apparatus according to the second embodiment of the present invention.

A display apparatus 30 of the second embodiment is different from the display apparatus 2 of the first embodi ment in that its illuminating component 32 is made of a light-accumulating material. The illuminating component 32 is formed of phosphors or the like which accumulate an energy by absorbing light emitted from another light source and emit the accumulated energy in the form of a light energy. The illuminating component 32 with a rectangular section is formed into a rectangular frame to correspond to the four sides of a rectangular screen 6 which forms the front surface of a display apparatus main body 12, and is arranged in tight contact with the screen 6. Except for this, the structure of the display apparatus 30 is completely the same as that of the first embodiment, and a detailed description thereof will be omitted.

In the second embodiment as well, a gap 10 between the screen 6 and a plate body 8 is closed by the illuminating component 32, which illuminates the screen 6, to form a sealed space, so that dust and the like are prevented from entering the gap 10.

As has been described above, according to the present invention, the screen is illuminated by the illuminating means arranged on the screen.

Simultaneously, the gap between the screen and a plate body is closed by the illuminating means at its peripheral portion, so that dust and the like are prevented from entering the gap. As a result, the illumination and dustproof structure of the screen can be achieved by one component, thereby realizing a reduction in component cost and assembly cost.

What is claimed is:

1. A display apparatus comprising:

a display unit having a flat screen;

an illuminating component formed into a frame to correspond to a peripheral edge portion of said screen and arranged in tight contact with said screen; and a transparent plate arranged on an opposite side of said screen in tight contact with said illuminating component to face said screen, wherein said illuminating component entirely seals a peripheral portion of a gap between said screen and said transparent plate.

2. An apparatus according to claim 1, wherein said illuminating component comprises an EL element.

3. An apparatus according to claim 2, wherein said apparatus further comprises a circuit board on which said display unit is to be mounted with said screen facing up, and when said display unit is mounted on said circuit board, a terminal of said EL element comes into electrical contact with a contact formed on said circuit board.

4. An apparatus according to claim 1, wherein said apparatus further comprises lower and upper housings for accommodating said display unit, and a window formed in said upper housing to correspond to said screen and having an inner edge portion with a step, and said transparent component is arranged on said illuminating component in tight contact therewith with a peripheral portion thereof engaging with said step of said inner edge portion.

5. An apparatus according to claim 4, wherein said step of said inner edge portion comprises an outer frame portion formed on an outer surface side of said upper housing, an inner frame portion formed on an inner surface side of said upper housing and having a thickness substantially equal to that of said illuminating component, and a step portion for connecting said outer frame portion and said inner frame portion to each other, said transparent portion is supported by said step portion at said peripheral edge portion thereof while being fitted in said outer frame portion, and said illuminating component is arranged in tight contact with said transparent plate and said screen of said display unit with two surfaces thereof while being fitted in said inner frame portion.

6. An apparatus according to claim 1, wherein said display unit comprises a liquid crystal display apparatus.

7. An apparatus according to claim 1, wherein said illuminating component is made of a light-accumulating material which accumulates an external energy to emit light.

8. An apparatus according to claim 1, wherein said display unit, said illuminating component, and said transparent plate constitute a display apparatus for a portable phone.

* * * * *